G. J. HARRIS.
Locking-Nuts on Bolts.

No. 128,389.              Patented June 25, 1872.

Witnesses.
Chas. H. Smith
Geo. A. Wacker.

George J. Harris
Lemuel W. Serrell
Atty.

UNITED STATES PATENT OFFICE.

GEORGE J. HARRIS, OF BROOKLYN, NEW YORK.

IMPROVEMENT IN LOCKING NUTS ON BOLTS.

Specification forming part of Letters Patent No. 128,389, dated June 25, 1872.

*To all whom it may concern:*

Be it known that I, GEORGE J. HARRIS, of Brooklyn, in the county of Kings and State of New York, have invented an Improvement in Locking the Nuts of Bolts; and the following is declared to be a correct description thereof.

Lock-nuts have been employed on the fish-plates of railroad bars. In some instances sheet-metal washers have been introduced between the nut and bar, and the sheet metal has been turned up against one of the flat sides of the nut. This, however, is liable to break when flattened when the nut has to be turned. A movable plate, also, has been used held by a turning-button, the stem of which passes through the fish-plate, rendering it necessary to provide a hole especially for that stem.

My invention relates to a base-plate beneath two or more nuts, and held by them in combination with an external removable locking-plate connected to the base-plate, so that, after the nuts have been screwed up, the locking-plate can be put over them and secured with facility by being attached to the base-plate by a key or equivalent connecting device, the reverse operation allowing the locking-plate to be removed and the nuts tightened or loosened, as occasion may require.

Figure 1:
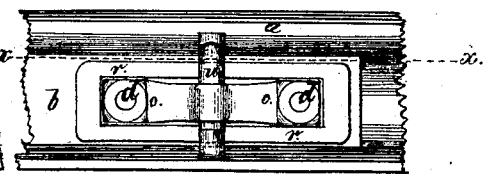
Figure 2:
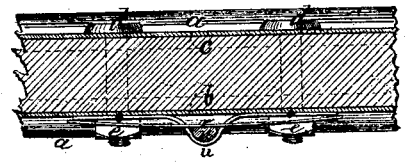

In the drawing, Figure 1 shows the locking device complete as applied to two nuts. Fig. 2 is a sectional plan of the same at the line $x$ $x$, Fig. 1; and Fig. 3 represents a variation in the said attachment of the locking-plate.

The railroad bar $a$, fish or joint plates $b$ $c$, and bolts $d$, and nuts $e$ are to be of any desired character. Beneath two or more of the nuts $e$ is the base-plate $o$, and outside of this is the locking-plate $r$. This plate $r$ is adapted to set against or receive into openings in it the flat or polygonal sides of the nuts $e$, and the plates $o$ and $r$ are connected together.

As a means of connecting these plates $o$ and $r$ I have shown a loop bent up in the plate $o$ projecting through an opening in the plate $r$, and a key (which may be of wood) passed between this loop and the front of the plate $r$ to retain the latter in place. This plate $r$ should be made in a slightly-arched form to make a spring to aid in preventing the key $n$ being disconnected.

Figure 3:
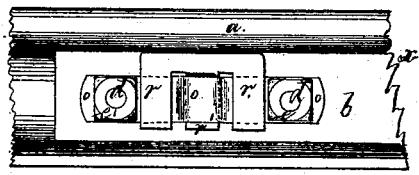

The key that connects the plate $r$ to the plate $o$ is shown in Fig. 3 as a part of the plate $r$, and marked $r'$.

I claim as my invention—

The base-plate $o$ passing beneath the nuts, in combination with the locking-plate $r$ acting to hold the nuts from turning, and a removable key to connect the plates $o$ and $r$ together, substantially as set forth.

Signed by me this 7th day of June, A. D. 1870.

GEORGE J. HARRIS.

Witnesses:
   CHAS. H. SMITH,
   GEO. T. PINCKNEY.